(12) United States Patent
Choi

(10) Patent No.: US 11,066,031 B2
(45) Date of Patent: Jul. 20, 2021

(54) AIRBAG DEVICE FOR DRIVER'S SEAT

(71) Applicant: Hyundai Mobis Co., Ltd., Seoul (KR)

(72) Inventor: Jung Geun Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 126 days.

(21) Appl. No.: 16/374,124

(22) Filed: Apr. 3, 2019

(65) Prior Publication Data
US 2019/0308580 A1 Oct. 10, 2019

(30) Foreign Application Priority Data

Apr. 4, 2018 (KR) .................. 10-2018-0038926

(51) Int. Cl.
*B60R 21/237* (2006.01)
*B60R 21/2338* (2011.01)
*B60R 21/203* (2006.01)

(52) U.S. Cl.
CPC ........ *B60R 21/2035* (2013.01); *B60R 21/237* (2013.01); *B60R 21/2338* (2013.01)

(58) Field of Classification Search
CPC .............. B60R 21/203; B60R 21/2032; B60R 21/2035; B60R 21/231; B60R 21/2334; B60R 21/2338; B60R 21/2342; B60R 21/237; B60R 2021/23382
See application file for complete search history.

(56) References Cited

U.S. PATENT DOCUMENTS

| | | | | |
|---|---|---|---|---|
| 5,048,863 A | * | 9/1991 | Henseler | B60R 21/2342 280/743.1 |
| 5,333,903 A | * | 8/1994 | Eyrainer | B60R 21/239 280/743.1 |
| 5,358,273 A | * | 10/1994 | Onishi | B60R 21/233 280/729 |
| 5,558,365 A | * | 9/1996 | Oe | B60R 21/2032 280/731 |
| 5,732,973 A | * | 3/1998 | Turnbull | B60R 21/2342 280/730.1 |
| 5,806,881 A | * | 9/1998 | Richter | B60R 21/231 280/730.2 |
| 5,871,231 A | * | 2/1999 | Richards | B60R 21/2342 180/268 |
| 5,979,937 A | * | 11/1999 | Yoshida | B60R 21/2338 280/739 |
| 6,164,696 A | * | 12/2000 | Ellerbrok | B60R 21/2342 280/729 |
| 6,196,575 B1 | * | 3/2001 | Ellerbrok | B60R 21/233 280/729 |

(Continued)

*Primary Examiner* — Barry Gooden, Jr.
(74) *Attorney, Agent, or Firm* — H.C. Park & Associates, PLC

(57) ABSTRACT

An airbag device for a driver's seat may include: a housing mounted on a steering part; an inflator mounted on the housing; and a cushion accommodated in the housing, deployed by gas supplied from the inflator, and having a cushion front part and a cushion rear part, wherein the cushion front part is configured such that an upper portion thereof is expanded and deployed and deployment of a lower portion thereof is partially restricted when the cushion is deployed, and the cushion rear part is disposed opposite the cushion front part to partially restrict the deployment of the lower portion of the cushion front part.

10 Claims, 8 Drawing Sheets

(56) References Cited

U.S. PATENT DOCUMENTS

| | | | | |
|---|---|---|---|---|
| 6,352,283 | B1* | 3/2002 | Ellerbrok | B60R 21/2342 280/743.1 |
| 7,441,805 | B2* | 10/2008 | Jamison | B60R 21/233 280/730.1 |
| RE43,353 | E* | 5/2012 | Schneider | B60R 21/2338 280/732 |
| 8,414,023 | B2* | 4/2013 | Naganawa | B60R 21/239 280/743.2 |
| 8,944,462 | B2* | 2/2015 | Fischer | B60R 21/205 280/743.1 |
| 9,022,422 | B2* | 5/2015 | Nam | B60R 21/231 280/731 |
| 10,493,941 | B2* | 12/2019 | Szawarski | B60R 21/2338 |
| 2001/0028162 | A1* | 10/2001 | Takimoto | B60R 21/237 280/731 |
| 2005/0098992 | A1* | 5/2005 | Yamada | B60R 21/233 280/743.1 |
| 2005/0212276 | A1* | 9/2005 | Yamada | B60R 21/2338 280/743.2 |
| 2011/0210533 | A1* | 9/2011 | Adachi | B60R 21/217 280/728.2 |
| 2011/0241323 | A1* | 10/2011 | Naganawa | B60R 21/203 280/731 |
| 2013/0093171 | A1* | 4/2013 | Eckert | B60R 21/2338 280/743.2 |
| 2013/0181429 | A1* | 7/2013 | Weng | B60R 21/203 280/731 |
| 2016/0288756 | A1* | 10/2016 | Ishiguro | B60R 21/203 |
| 2017/0015266 | A1* | 1/2017 | El-Jawahri | B60R 21/233 |
| 2017/0096118 | A1* | 4/2017 | Kruse | B60R 21/203 |
| 2018/0170302 | A1* | 6/2018 | Kim | B60R 21/2338 |
| 2018/0281731 | A1* | 10/2018 | Hotta | B60R 21/233 |
| 2018/0361979 | A1* | 12/2018 | Schneider | B60R 21/235 |
| 2019/0077358 | A1* | 3/2019 | Fujimaki | B60R 21/203 |
| 2020/0282946 | A1* | 9/2020 | Koshikawa | B60R 21/237 |

* cited by examiner

AIRBAG DEVICE FOR DRIVER'S SEAT

CROSS-REFERENCE TO RELATED APPLICATION

This application claims priority from and the benefit of Korean Patent Application No. 10-2018-0038926, filed on Apr. 4, 2018, which is hereby incorporated by reference for all purposes as if fully set forth herein.

BACKGROUND

Field

Exemplary embodiments relate to an airbag device for a driver's seat, and more particularly, to an airbag device for a driver's seat, which is capable of absorbing impact on a driver's head and chest.

Discussion of the Background

In general, a steering wheel is disposed in front of a driver's seat of a vehicle to steer wheels. The steering wheel is equipped with an airbag device for a driver's seat, which is inflated and deployed to protect a driver in the event of a vehicle accident.

The airbag for the driver's seat is inflated by internal gas pressure to rapidly restrain a driver's head and chest, thus preventing his or her head or chest from colliding with the steering wheel and being injured.

Meanwhile, in a new car assessment test (NCAP) that is newly revised in North American regulations, the method of calculating a crash result is changed, and the sensitivity of a dummy is maximized, so that it is difficult to obtain a high score with a conventional airbag for a driver's seat. Thus, there is a need to improve the airbag for the driver's seat so as to rapidly restrain the head of the dummy and reduce chest pressure.

The above information disclosed in this Background section is only for enhancement of understanding of the background of the invention and, therefore, it may contain information that does not constitute prior art.

SUMMARY

Exemplary embodiments of the present invention provide an airbag device for a driver's seat, which is capable of absorbing impact on a driver's head and chest.

In one embodiment, an airbag device for a driver's seat may include: a housing mounted on a steering part; an inflator mounted on the housing; and a cushion accommodated in the housing, deployed by gas supplied from the inflator, and having a cushion front part and a cushion rear part, wherein the cushion front part may be configured such that an upper portion thereof may be expanded and deployed and deployment of a lower portion thereof may be partially restricted when the cushion is deployed, and the cushion rear part may be disposed opposite the cushion front part to partially restrict the deployment of the lower portion of the cushion front part.

The cushion front part may include a front panel part deployed towards a driver by gas supplied from the inflator, the front panel part may include a front expansion part formed by folding the front panel part in multiple plies, the front expansion part being unfolded and expanded when deployed; and a front restriction part disposed under the front expansion part, formed by folding the front panel part in multiple plies, the front restriction part being kept folded even when deployed.

The front expansion part may include an expansion crease part made by folding the front panel part in a zigzag shape; and an expansion extension part extending from the expansion crease part, and connected with the front panel part outside an area of the front expansion part.

The front restriction part may include a restriction crease part made by folding the front panel part in a zigzag shape; and a restriction binding part binding the restriction crease part and causing the restriction crease part to be kept folded when deployed.

The front restriction part may be located in a lower portion of a central portion of the front panel part to create a concave shape when the cushion is deployed.

The front restriction part may be located in each of lower portions of both sides of the front panel part to create a convex shape when the cushion is deployed.

The cushion rear part may include a rear panel part coupled with the cushion front part to face the cushion front part, and the rear panel part may include a rear fold part formed by folding the rear panel part in multiple plies, the rear fold part being kept folded even when deployed.

The rear fold part may include a fold crease part made by folding the rear panel part in a zigzag shape; and a fold binding part binding the fold crease part and causing the fold crease part to be kept folded when deployed.

The airbag device may further include a tether part coupled to the cushion front part and the cushion rear part to restrain the deployed cushion.

The tether part may include an upper tether part coupled at one end thereof to the rear panel part above a rear introduction part intro which gas is introduced, and coupled at the other end to the front panel part under the front expansion part; and a lower tether part coupled at one end thereof to the rear panel part between the rear introduction part and the rear fold part, and coupled at the other end to the front panel part above the front restriction part.

The airbag device for the driver's seat in accordance with the present invention may prevent the collision between the steering wheel part and the driver and may be applied to various kinds of vehicles.

The airbag device for the driver's seat in accordance with the present invention causes a foldable structure, namely, the front expansion part to be unfolded when the cushion is deployed, thus increasing the volume of the upper end of the cushion and rapidly protecting the head of the driver.

The airbag device for the driver's seat in accordance with the present invention allows the deployment of the cushion to be partially restricted at the lower end of the cushion by the front restriction part, thus reducing pressure on the chest of the driver. Here, a deployment restriction point on the lower end of the cushion may be one point on a central portion and one point on each of left and right sides, and may be tuned depending on the situation.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
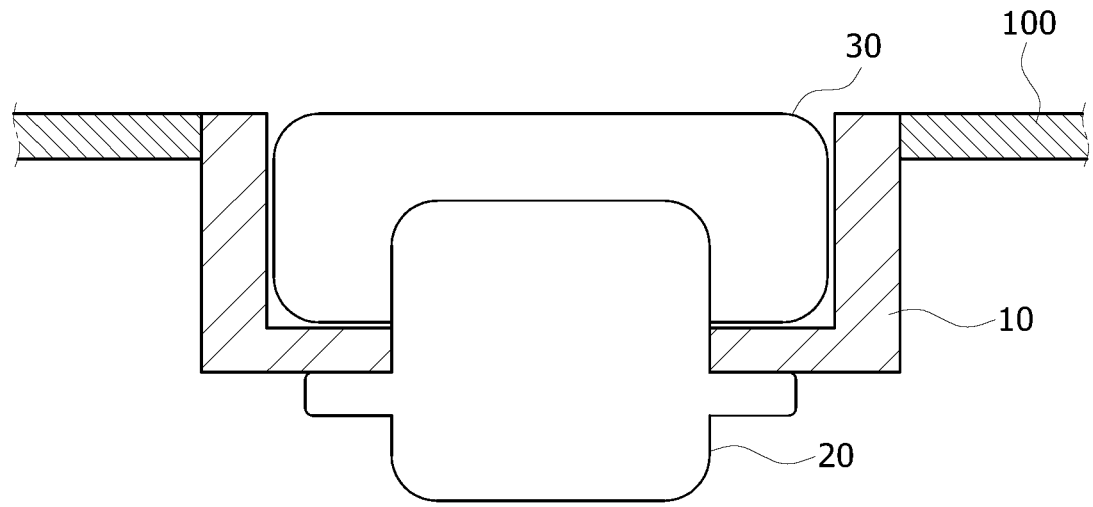
FIG. 1 is a sectional view schematically illustrating an airbag device for a driver's seat in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereafter, an airbag device for a driver's seat in accordance with embodiments of the invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
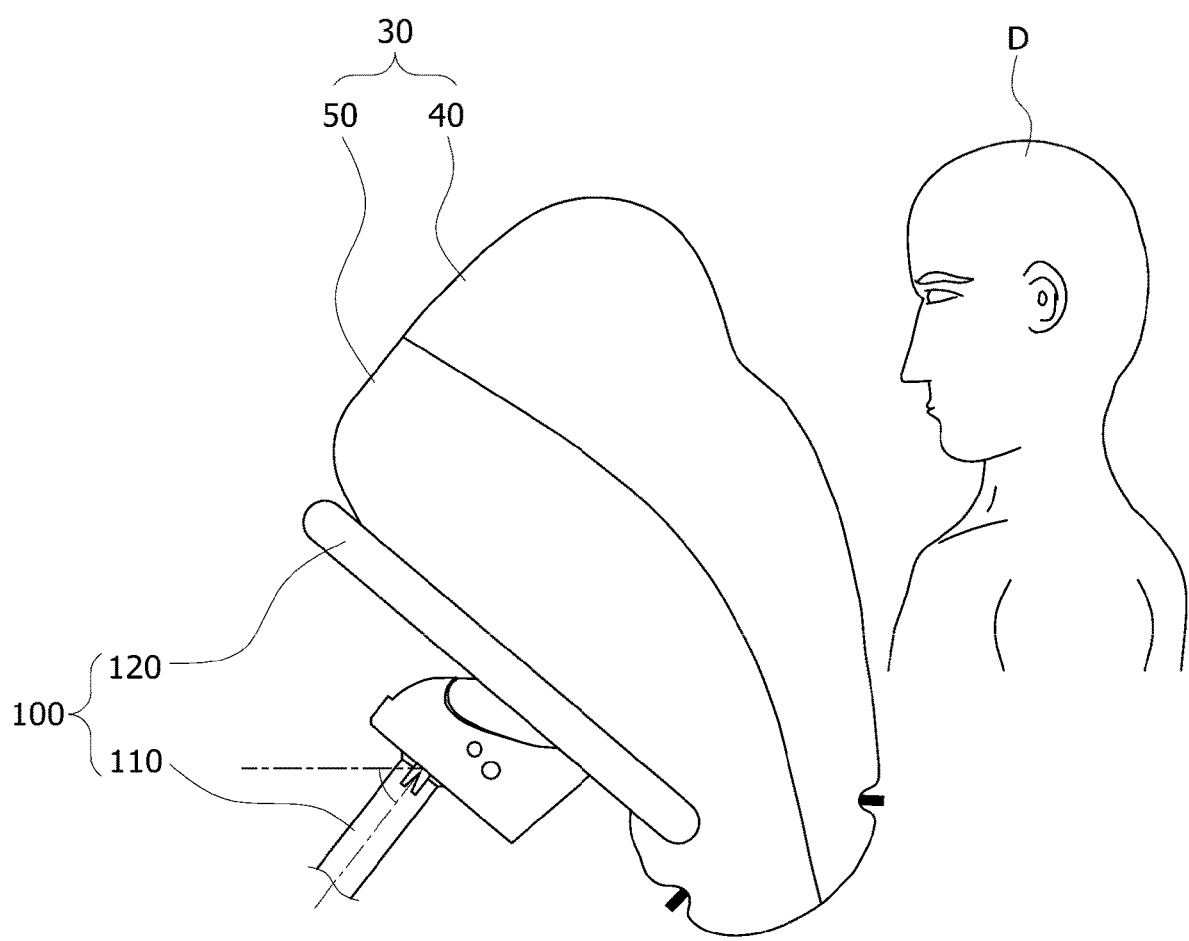
FIG. 2 is a view schematically illustrating a state in which the airbag device for the driver's seat in accordance with the embodiment of the present invention is deployed.

FIG. 1 is a sectional view schematically illustrating an airbag device for a driver's seat in accordance with an embodiment of the present invention, and FIG. 2 is a view schematically illustrating a state in which the airbag device for the driver's seat in accordance with the embodiment of the present invention is deployed. Referring to FIGS. 1 and 2, the airbag device 1 for the driver's seat in accordance with the embodiment of the present invention includes a housing 10, an inflator 20, and a cushion 30.

The housing 10 is mounted on a steering part 100. For example, the housing 10 may be disposed on a central portion of a front of the steering part 100, and a cover part may be removed by an expansion force of the cushion 30.

The steering part 100 may include a steering column part 110 and a steering wheel part 120. The steering wheel part 120 is mounted on an upper end of the steering column part 110 and steers a wheel while being rotated leftwards or rightwards by a driver. The housing 10 may be mounted on the steering wheel part 120.

The inflator 20 is mounted on the housing 10. For example, the inflator 20 may be operated to discharge gas in the case of detecting a crash via a crash sensor. The inflator 20 may be mounted on a lower portion of the housing 10.

The cushion 30 is accommodated in the housing 10, and is deployed by gas discharged from the inflator 20 to protect a passenger. For example, the cushion 30 is made of an elastic material and is inflated by the supply of gas, thus coming into contact with a passenger and absorbing shocks on the passenger.

The cushion 30 is coupled to the inflator 20 and is held in the housing 10 in a folded state. Furthermore, if gas is discharged from the inflator 20, the cushion 30 protrudes out while rupturing the cover part of the housing 10, thus protecting a passenger.

The cushion 30 in accordance with the embodiment of the present invention includes a cushion front part 40 and a cushion rear part 50.

The cushion front part 40 is deployed towards a driver D by gas supplied from the inflator 20 to come into contact with the driver D. Particularly, an upper portion of the cushion front part 40 is expanded and deployed to protect the head of the driver D, and a lower portion of the cushion front part 40 is partially restricted in deployment to reduce pressure acting on the chest of the driver D.

The cushion rear part 50 is disposed opposite the cushion front part 40 to partially restrict the deployment of the lower portion of the cushion front part 40. Thus, the cushion rear part guides the downward deployment of the cushion 30 to rapidly cover the steering wheel part 120.

Figure 3:
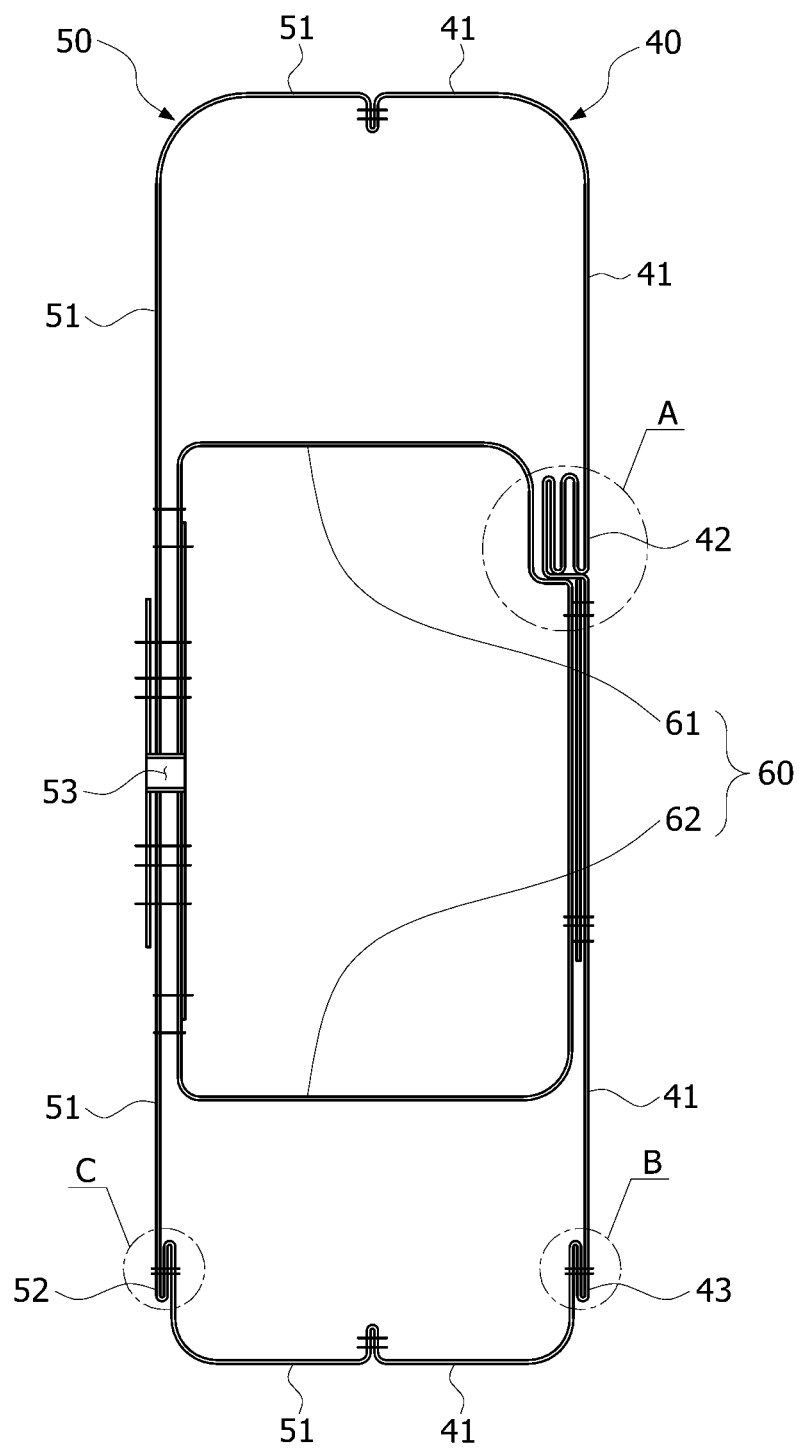
FIG. 3 is a view schematically illustrating a cushion in the airbag device for the driver's seat in accordance with the embodiment of the present invention.

FIG. 3 is a view schematically illustrating the cushion in the airbag device for the driver's seat in accordance with the embodiment of the present invention. Referring to FIG. 3, the cushion front part 40 in accordance with the embodiment of the present invention includes a front panel part 41.

The front panel part 41 is disposed to face the cushion rear part 50, and is a part that is located towards the driver D in the airbag device for the driver's seat to come into contact with the driver D when the cushion is deployed.

The front panel part 41 includes a front expansion part 42 and a front restriction part 43.

The front expansion part 42 is a part of the front panel part 41 in which the front panel part 41 is folded in multiple plies. That is, the front expansion part 42 means an area that is folded before the cushion is deployed but is unfolded when the cushion is deployed. Thus, if the airbag device for the driver's seat has been deployed, the front expansion part 42 is not exposed to the outside when the airbag device is not deployed but is unfolded as illustrated in FIG. 2 to face the driver D as in the remaining area of the front panel part 41.

Since an area of the front panel part 41 in which the front expansion part 42 is located is further expanded and deployed towards the driver D as compared to the remaining area, by the front expansion part 42, it is possible to more efficiently protect the head of the driver D.

The front expansion part 42 is disposed in an upper portion and the front restriction part 43 is disposed in a lower portion with respect to the center of the entire area of the front panel part 41.

The front restriction part 43 is a part of the front panel part 41 in which the front panel part 41 is folded in multiple plies. The deployment of the front restriction part is restricted even when gas is supplied by the inflator 20.

Figure 4:
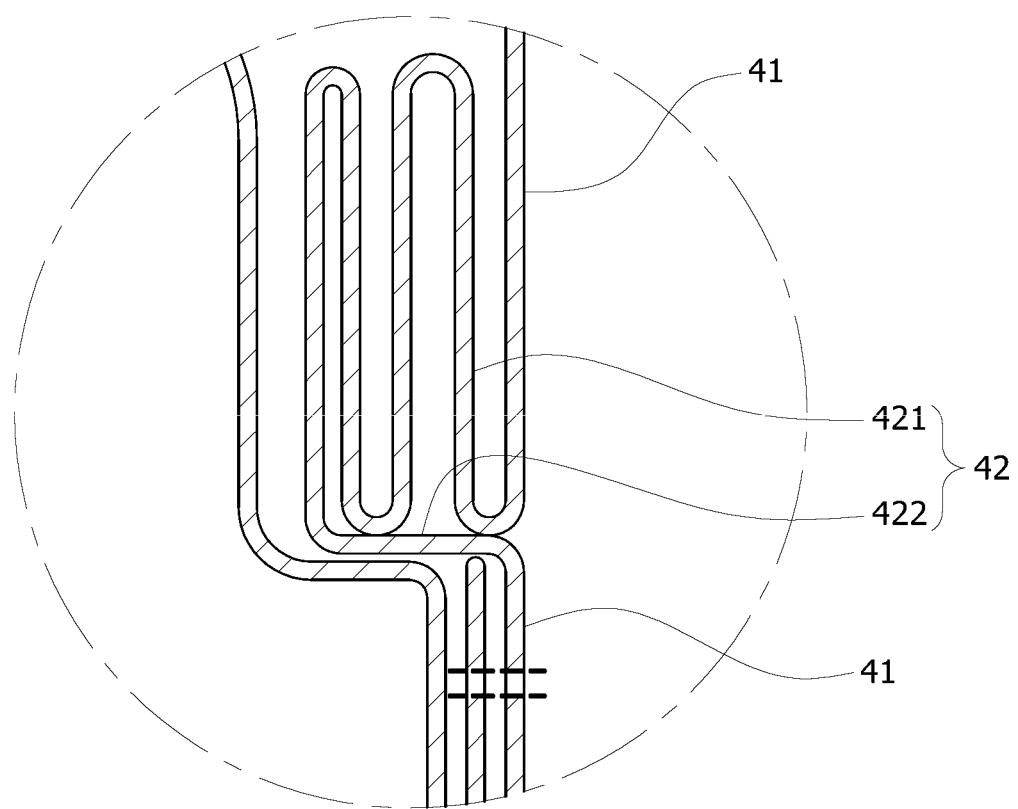
FIG. 4 is a detailed view illustrating portion A encircled by a dotted line in FIG. 3.

FIG. 4 is a detailed view illustrating portion A encircled by a dotted line in FIG. 3. Referring to FIGS. 3 and 4, the front expansion part 42 in accordance with the embodiment of the present invention includes an expansion crease part 421 and an expansion extension part 422.

One or more expansion crease parts 421 are made by folding the front panel part 41 in multiple plies. For example, the expansion crease part 421 is made by folding the front panel part 41 in a zigzag shape several times.

The expansion extension part 422 extends from the expansion crease part 421, and is connected with the front panel part 41 outside an area of the front expansion part 42. While the airbag device for the driver's seat is deployed, the expansion extension part 422 may be pulled by the front restriction part 43. For example, the expansion extension part 422 may be connected with an area of the front panel part 41 other than the expansion crease part 421.

Figure 5:
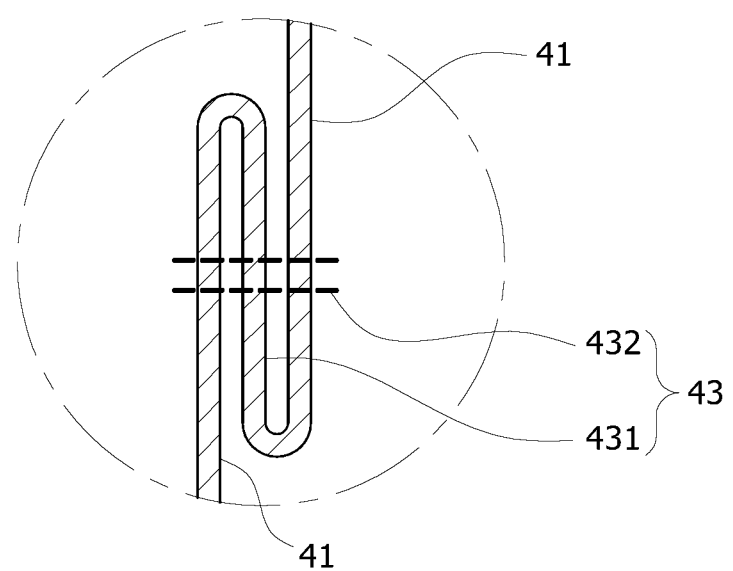
FIG. 5 is a detailed view illustrating portion B encircled by a dotted line in FIG. 3.

FIG. 5 is a detailed view illustrating portion B encircled by a dotted line in FIG. 3. Referring to FIGS. 3 and 5, the front restriction part 43 in accordance with the embodiment of the present invention includes a restriction crease part 431 and a restriction binding part 432.

The restriction crease part 431 is made by folding the front panel part 41 in multiple plies. For example, the restriction crease part 431 is made by folding the front panel part 41 in a zigzag shape several times.

The restriction binding part 432 binds the restriction crease part 431 folded in several plies to prevent the restriction crease part 431 from being unfolded even if gas is supplied from the inflator 20. That is, the restriction binding part 432 causes the restriction crease part 431 to be kept non-deployed. For example, the restriction binding part 432 may bind the restriction crease part 431 by sewing, and a plurality of sewing lines may be formed.

Figure 6:
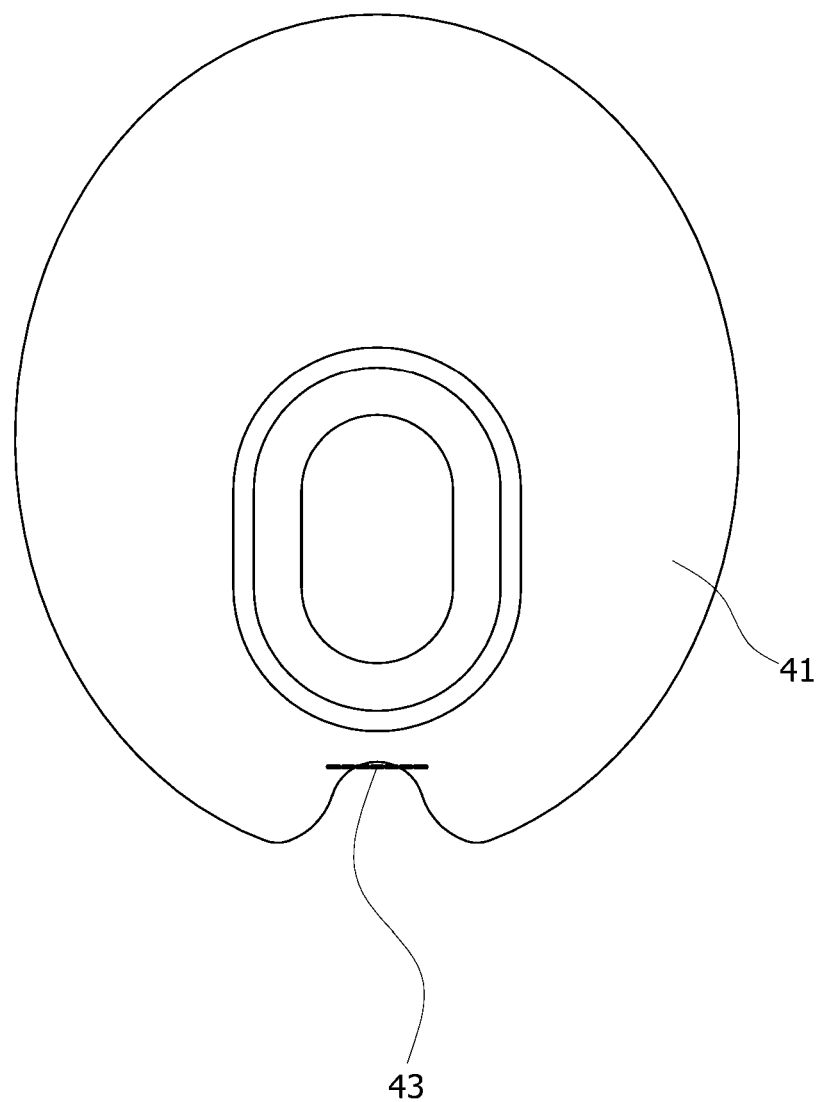
FIG. 6 is a view schematically illustrating a state in which a lower portion of a front panel part takes a concave shape by a front restriction part in the airbag device for the driver's seat in accordance with the embodiment of the present invention.

FIG. 6 is a view schematically illustrating a state in which the lower portion of the front panel part takes a concave shape by the front restriction part in the airbag device for the driver's seat in accordance with the embodiment of the present invention.

Referring to FIGS. 5 and 6, when seeing the airbag device for the driver's seat from the front, the front restriction part 43 is located in the lower portion of the central portion of the front panel part 41. Thus, since the deployment of the lower portion of the central portion of the front panel part 41 is restricted, both sides thereof protrude downwards with respect to the front restriction part 43, so that the central portion has the concave shape. Such a deployed shape of the front panel part 41 may reduce pressure on the chest of the driver D. Furthermore, since impact on the chest of the dummy may be reduced even when a plurality of sensors is disposed on the chest of the dummy in the test of relevant regulations, it is possible to meet the relevant regulations.

Figure 7:
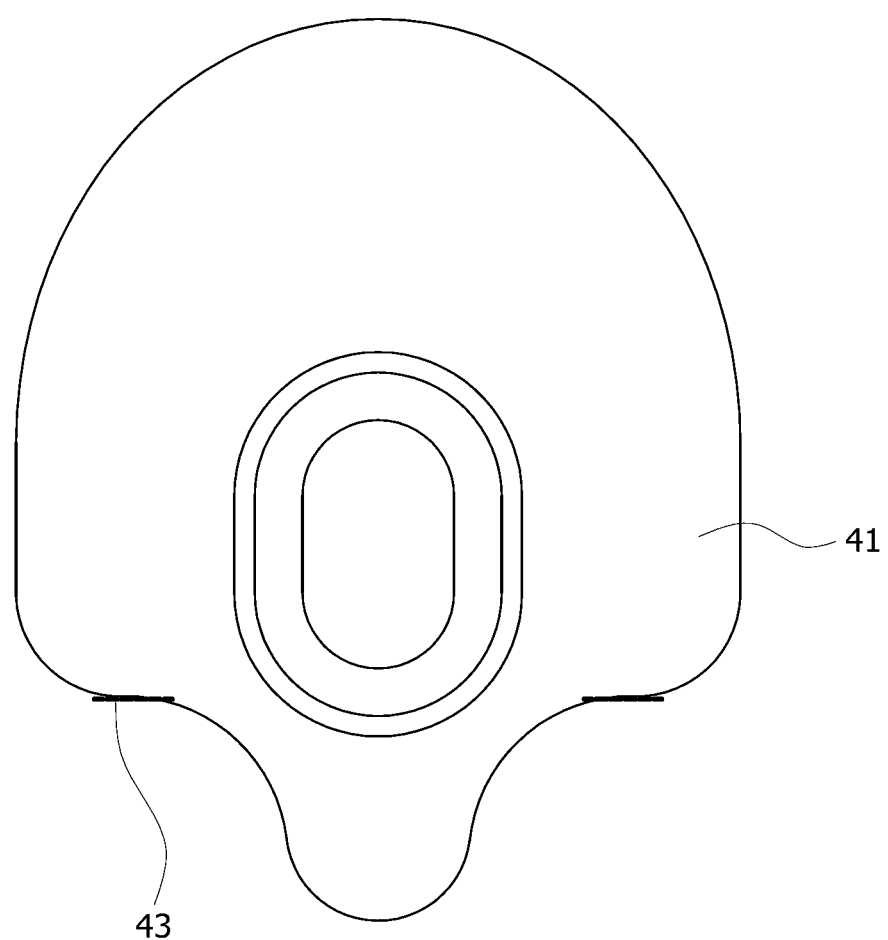
FIG. 7 is a view schematically illustrating a state in which the lower portion of the front panel part takes a convex shape by the front restriction part in the airbag device for the driver's seat in accordance with the embodiment of the present invention.

FIG. 7 is a view schematically illustrating a state in which the lower portion of the front panel part takes a convex shape by the front restriction part in the airbag device for the driver's seat in accordance with the embodiment of the present invention.

Referring to FIGS. 5 and 7, when seeing the airbag device for the driver's seat from the front, the front restriction parts 43 are located, respectively, on both sides of the lower portion of the front panel part 41. Thus, since the deployment of the central portion of the lower portion of the front panel part 41 is possible but the deployment of both sides of the central portion thereof is restricted, a portion between the pair of front restriction parts 43 protrudes downwards, so that the central portion has the convex shape. Such a deployed shape of the front panel part 41 may reduce pressure on the chest of the driver D. Furthermore, since impact on the chest of the dummy may be reduced even when a plurality of sensors is disposed on the chest of the dummy in the test of relevant regulations, it is possible to meet the relevant regulations.

Referring to FIG. 3, the cushion rear part 50 in accordance with the embodiment of the present invention includes a rear panel part 51.

The rear panel part 51 is coupled with the cushion front part 40 to face the cushion front part 40. For example, the rear panel part 51 may be mounted on the inflator 20 and be sewn onto an edge of the front panel part 41. A rear introduction part 53 may be formed on the rear panel part 51 to introduce gas from the inflator 20.

The rear panel part 51 includes a rear fold part 52.

The rear fold part 52 is a part of the rear panel part 51 in which the rear panel part 51 is folded in multiple plies. The deployment of the rear fold part is restricted even when gas is supplied by the inflator 20.

The rear fold part 52 is disposed in the lower portion with respect to the central area of the rear panel part 51.

Figure 8:
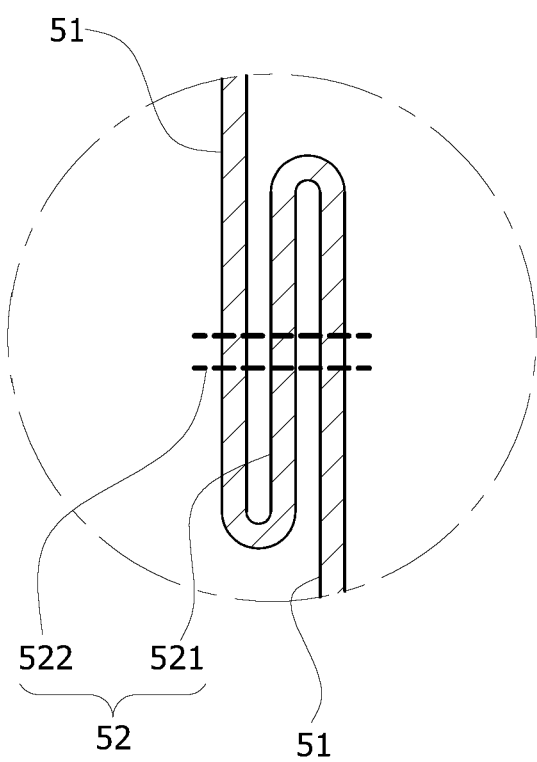
FIG. 8 is a detailed view illustrating portion C encircled by a dotted line in FIG. 3.

FIG. 8 is a detailed view illustrating portion C encircled by a dotted line in FIG. 3. Referring to FIGS. 3 and 8, the rear fold part 52 in accordance with the embodiment of the present invention includes a fold crease part 521 and a fold binding part 522.

The fold crease part 521 is made by folding the rear panel part 51 in multiple plies. For example, the fold crease part 521 is made by folding the rear panel part 51 in a zigzag shape several times.

The fold binding part 522 binds the fold crease part 521 folded in several plies to prevent the fold crease part 521 from being unfolded even if gas is supplied from the inflator 20. That is, the fold binding part 522 causes the fold crease part 521 to be kept non-deployed. For example, the fold binding part 522 may bind the fold crease part 521 by sewing, and a plurality of sewing lines may be formed.

Referring to FIG. 3, the airbag device 1 for the driver's seat in accordance with the embodiment of the present invention may further include a tether part 60. The tether part 60 is coupled to the cushion front part 40 and the cushion rear part 50 to restrain the cushion 30 that protrudes forwards when the cushion 30 is deployed.

The tether part 60 in accordance with the embodiment of the present invention includes an upper tether part 61 and a lower tether part 62. In this regard, the upper tether part 61 may be longer than the lower tether part 62 to allow the upper portion of the cushion 30 to protrude further forwards than the lower portion when the cushion 30 is deployed.

The upper tether part 61 is coupled at one end thereof to the cushion rear part 50, and coupled at the other end to the cushion front part 40. To be more specific, one end of the upper tether part 61 is coupled to a portion of the rear panel part 51 disposed above the rear introduction part 53. Furthermore, the other end of the upper tether part 61 is coupled to a portion of the front panel part 41 disposed under the front expansion part 42. The upper tether part 61 restricts the rise of the front expansion part 42 to cause the front expansion part 42 to be guided towards the head of the driver D.

The lower tether part 62 is coupled at one end thereof to the cushion rear part 50, and coupled at the other end to the cushion front part 40. To be more specific, one end of the lower tether part 62 is disposed under the rear introduction part 53, and is coupled to a portion of the rear panel part 51 formed between the rear introduction part 53 and the rear fold part 52. Furthermore, the other end of the lower tether part 62 is coupled to a portion of the front panel part 41 disposed between the other end of the upper tether part 61 and the front restriction part 43. Such a lower tether part 62 may guide the cushion to prevent the lower portion of the cushion 30 from excessively sagging and to allow the cushion 30 to stably support the chest.

The operation of the airbag device for the driver's seat in accordance with the embodiment of the present invention configured as described above will be described below.

If an accident is detected, gas is discharged from the inflator 20 and then the cushion 30 is deployed to protect the driver D.

At this time, the front expansion part 42 formed on the upper portion of the front panel part 41 is unfolded and then volume is increased, thus rapidly protecting the head of the driver D. Furthermore, the front restriction part 43 formed on the lower portion of the front panel part 41 restricts the deployment, thus absorbing shocks on the chest of the driver D.

Meanwhile, since the rear fold part 52 formed on the lower portion of the rear panel part 51 causes the cushion 30 to be deployed downwards, it is possible to prevent a collision between the driver D and the steering wheel part 120.

The airbag device 1 for the driver's seat in accordance with the embodiment of the present invention may prevent the collision between the driver D and the steering wheel part 120 and may be applied to various kinds of vehicles.

The airbag device 1 for the driver's seat in accordance with the embodiment of the present invention causes the front expansion part 42 to be unfolded when the cushion 30 is deployed, thus increasing the volume of the upper end of the cushion 30 and rapidly protecting the head of the driver D.

The airbag device 1 for the driver's seat in accordance with the embodiment of the present invention allows the deployment of the cushion to be partially restricted at the lower end of the cushion 30 by the front restriction part 43, thus reducing pressure on the chest of the driver D. Here, a deployment restriction point on the lower end of the cushion 30 may be one point on a central portion and one point on each of left and right sides, and may be tuned depending on the situation.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An airbag device for a driver's seat, comprising:
   a housing mounted on a steering part;
   an inflator mounted on the housing; and
   a cushion configured to be contained in the housing, and to be deployed by gas supplied from the inflator, and having a cushion front part and a cushion rear part,
   wherein the cushion front part further comprises an upper portion and a lower portion, the upper portion of the cushion front part is configured to be expanded and deployed and deployment of the lower portion of the cushion front part is configured to be partially restricted when the cushion is deployed, and
   wherein the cushion rear part is disposed opposite the cushion front part to partially restrict the deployment of the lower portion of the cushion front part,
   wherein the cushion front part comprises a front panel part deployed towards a driver by the gas supplied from the inflator,
   the front panel part comprises:
   a front expansion part formed by folding the front panel part in multiple plies, the front expansion part is configured to be unfolded and expanded when deployed; and
   a front restriction part disposed under the front expansion part, formed by folding the front panel part in the multiple plies, the front restriction part is configured to be kept folded in a non-deployed folded state even when the air bag device is deployed,
   wherein the cushion rear part comprises a rear panel part coupled with the cushion front part to face the cushion front part, and
   wherein the rear panel part comprises a rear fold part formed by folding the rear panel part in multiple plies, the rear fold part is configured to be kept folded even when deployed.

2. The airbag device of claim 1, wherein the front expansion part comprises:
   an expansion crease part created by folding the front panel part in a zigzag shape; and
   an expansion extension part extending from the expansion crease part, and connected with the front panel part outside an area of the front expansion part.

3. The airbag device of claim 1, wherein the rear fold part comprises:
   a fold crease part created by folding the rear panel part in a zigzag shape; and
   a fold binding part configured to bind the fold crease part and to keep the fold crease part folded when deployed.

4. The airbag device of claim 1, wherein the front restriction part comprises:
   a restriction crease part created by folding the front panel part in a zigzag shape; and
   a restriction binding part configured to bind the restriction crease part and to keep the restriction crease part folded when deployed.

5. The airbag device of claim 4, wherein the front restriction part is located in a central portion of the front panel part when the cushion is folded and is configured to create a concave shape at a lower portion of the front panel part when the cushion is deployed.

6. The airbag device of claim 4, wherein the front restriction part is located in each of lower portions of both sides of the front panel part and is configured to create a convex shape when the cushion is deployed.

7. The airbag device of claim 1, further comprising a tether part coupled to the cushion front part and the cushion rear part configured to restrain the deployed cushion.

8. The airbag device of claim 7, wherein the tether part comprises:
   an upper tether part coupled at one end of the upper tether part to the rear panel part above a rear introduction part into which the gas is introduced, and coupled at another end of the upper tether part to the front panel part under the front expansion part; and a lower tether part coupled at one end of the lower tether part to the rear panel part between the rear introduction part and the rear fold part, and coupled at another end of the lower tether part to the front panel part above the front restriction part.

9. An airbag device for a driver's seat, comprising:
a housing mounted on a steering part;
an inflator mounted on the housing;
a cushion configured to be contained in the housing, and to be deployed by gas supplied from the inflator, and having a cushion front part and a cushion rear part; and
a tether part coupled to the cushion front part and the cushion rear part configured to restrain the deployed cushion,
wherein the cushion front part further comprises an upper portion and a lower portion, the upper portion of the cushion front part is configured to be expanded and deployed and deployment of a lower portion of the cushion front part is configured to be partially restricted when the cushion is deployed,
wherein the cushion rear part is disposed opposite the cushion front part to partially restrict the deployment of the lower portion of the cushion front part,
wherein the cushion rear part comprises a rear panel part coupled with the cushion front part to face the cushion front part,
wherein the rear panel part comprises a rear fold part formed by folding the rear panel part in multiple plies, the rear fold part is configured to be kept folded even when deployed, and
wherein the tether part comprises:
an upper tether part coupled at one end of the upper tether part to the rear panel part above a rear introduction part into which gas is introduced, and coupled at another end of the upper tether part to the front panel part under the front expansion part; and
a lower tether part coupled at one end of the lower tether part to the rear panel part between the rear introduction part and the rear fold part, and coupled at another end of the lower tether part to the front panel part above the front restriction part.

10. The airbag device of claim 9, wherein the rear fold part comprises:
a fold crease part created by folding the rear panel part in a zigzag shape; and
a fold binding part configured to bind the fold crease part and to keep the fold crease part folded when deployed.

* * * * *